(12) United States Patent  (10) Patent No.: US 7,539,807 B2
Sommer (45) Date of Patent: *May 26, 2009

(54) METHOD, APPARATUS AND SYSTEM FOR OPERATING AN EXPANSION CARD ACCORDING TO A SIGNALING VOLTAGE

(75) Inventor: Frank-Ulrich Sommer, Heidelberg (DE)

(73) Assignee: Siemens Aktiengesellschaft, Munich (DE)

( * ) Notice: Subject to any disclaimer, the term of this patent is extended or adjusted under 35 U.S.C. 154(b) by 178 days.

This patent is subject to a terminal disclaimer.

(21) Appl. No.: 11/708,381

(22) Filed: Feb. 20, 2007

(65) Prior Publication Data
US 2007/0266193 A1 Nov. 15, 2007

(30) Foreign Application Priority Data
Feb. 23, 2006 (EP) .................................. 06003742

(51) Int. Cl.
G06F 13/00 (2006.01)
G06F 1/26 (2006.01)
H05K 7/10 (2006.01)
(52) U.S. Cl. ...................................... 710/301; 710/104
(58) Field of Classification Search ................. 710/313; 327/318, 320
See application file for complete search history.

(56) References Cited

U.S. PATENT DOCUMENTS

| 5,911,050 | A * | 6/1999 | Egan et al. | 710/100 |
| 6,265,926 | B1 * | 7/2001 | Wong | 327/318 |
| 6,269,416 | B1 * | 7/2001 | Meier et al. | 710/301 |
| 7,249,213 | B2 * | 7/2007 | Feng et al. | 710/305 |
| 7,279,952 | B1 * | 10/2007 | O et al. | 327/320 |
| 2004/0210777 | A1 | 10/2004 | Cabezas et al. | |
| 2005/0088201 | A1 | 4/2005 | Devlin et al. | |

FOREIGN PATENT DOCUMENTS

| DE | 103 08 295 A1 | 9/2004 |
| EP | 0 889 415 A2 | 1/1999 |

OTHER PUBLICATIONS

PCI Special Interset Group; "PCI Local Bus Specification"; PCI Special Interest Group; Revision 3.0; Feb. 3, 2004; pp. 1-14 and 138-144.*

(Continued)

*Primary Examiner*—Paul R Myers
*Assistant Examiner*—Ryan M Stiglic

(57) ABSTRACT

A method for operating an expansion card of a computer is proposed, said computer having at least one slot for accommodating the expansion card, wherein there is stored in a memory area of the expansion card a first and a second configuration data record, one of which is assigned to a first and the other to a second signaling voltage, and wherein the configuration data records transmitted to a FPGA chip of the expansion card indicate to the FPGA chip whether a protection circuit is to be activated or deactivated. Suitable measures enable functional units of a PCI expansion card suitable for both a 3.3 V and a 5 V signaling voltage to be integrated in an FPGA together with a PCI controller, the expansion card being supplied or suppliable with an external voltage independently of a signaling voltage of a computer or basic system.

9 Claims, 1 Drawing Sheet

OTHER PUBLICATIONS

Actel Corporation; "Actel eX, SX-A, and RTSX-S I/Os"; Actel Corporation; Application Note AC200; Document No. 5192699-2/3.04; Mar. 2004; pp. 1-11.*

Kao et al.; "Understanding The Power Supply Requirements of PCI Bus Standard-How to Protect The Digital Components"; National Semiconductor; Application Note 1077; Document No. AN-1077; Jul. 1997; pp. 1-6.*

Wikipedia Die freie Enzyklopädie, "Steckplatz", Retrieved from Internet: http://www.de.wikipedia.org/wiki/Steckplatz.

* cited by examiner

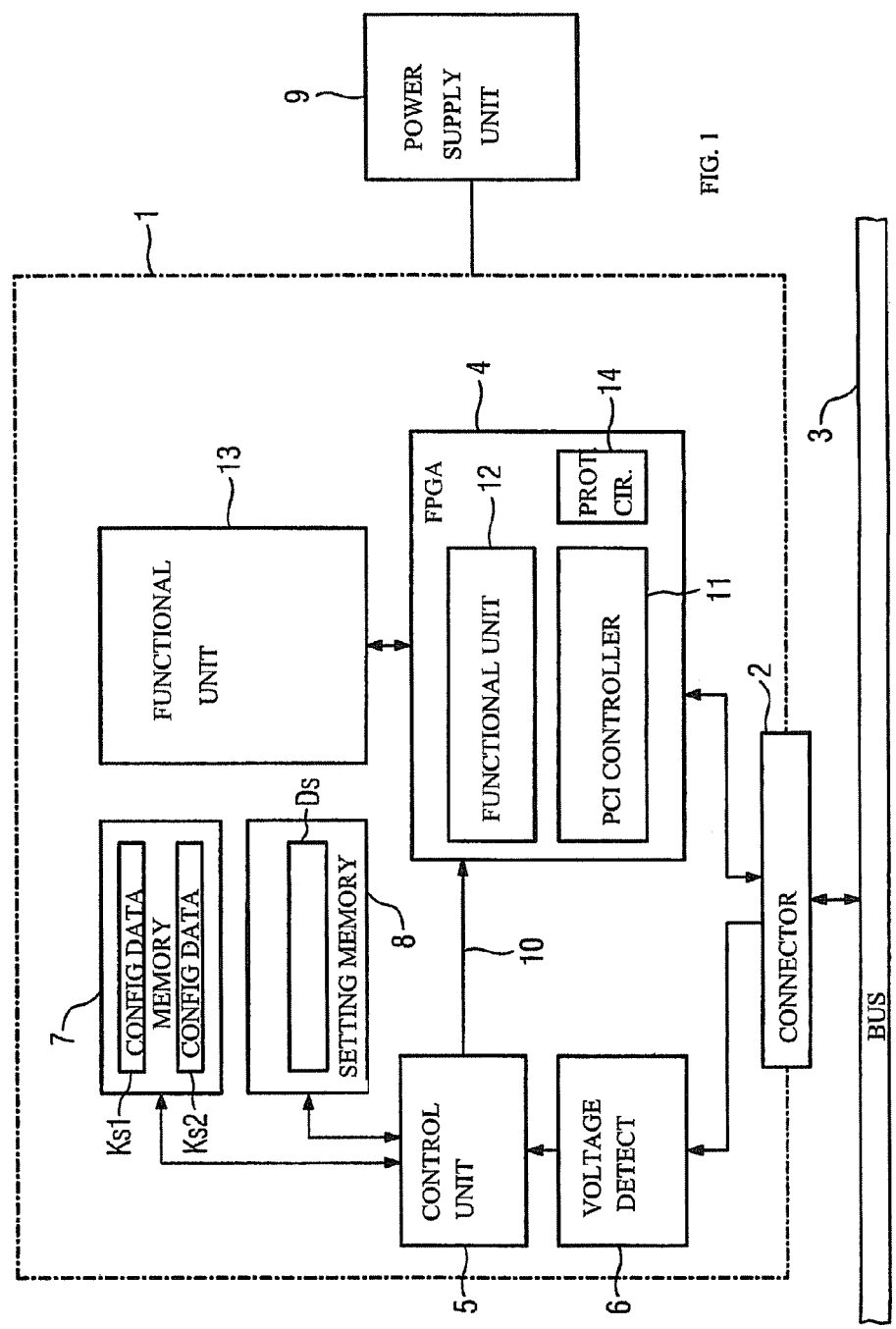

METHOD, APPARATUS AND SYSTEM FOR OPERATING AN EXPANSION CARD ACCORDING TO A SIGNALING VOLTAGE

CROSS REFERENCE TO RELATED APPLICATIONS

This application claims priority of European application No. 06003742.1 EP filed Feb. 23, 2006, which is incorporated by reference herein in its entirety.

FIELD OF INVENTION

The invention relates to a method for operating an expansion card of a computer provided with at least one slot for accommodating the expansion card, there being stored in a memory area of the expansion card a first and a second configuration data record, one of which is assigned to a first and the other to a second signaling voltage, and the configuration data records transmitted to a FPGA chip of the expansion card indicating to the FPGA chip whether a protection circuit must be activated or deactivated. The invention additionally relates to an expansion card for a computer and also to a computer having such an expansion card.

BACKGROUND OF INVENTION

A computer provided with a plurality of slots for accommodating expansion cards is known. These expansion slots are interconnected e.g. via a so-called PCI bus described in the "PCI Local Bus Specification" to which highly integrated controllers, peripheral expansion cards and/or processor and/or storage systems are also connected. The bus users can either be hard-wired to one another on a motherboard or inserted in the slots in the form of expansion cards, a combination of permanently integrated bus users and bus users in the form of expansion cards being the usual practice in computers.

SUMMARY OF INVENTION

When PCI bus technology was introduced, a signaling voltage of 5 V was mainly used in electronic devices and therefore also implemented in computers provided with a PCI bus. With increasing miniaturization (smaller semiconductor features, lower dielectric strength), the introduction of 3.3 V as an alternative signaling voltage became necessary. The signaling voltage is predefined by the computer or by a basic system, either 3.3 V or 5 V being used as the signaling voltage. However, expansion cards normally use 3.3 V only, 5 V only or both 3.3 V and 5 V.

In order to prevent an expansion card designed for use in a "3.3 V slot" from being accidentally insertable in a "5 V slot", the slot is mechanically keyed. For this purpose it has a separating web whose position is determined by the signaling voltage used. To enable it to be inserted, the expansion card must have a cutout at that point inside a direct connector. Because of the proliferation of systems using a 5 V signaling voltage, PCI expansion cards which only support a 3.3 V signaling voltage are encountered only rarely or in special situations. PCI expansion cards supporting both 3.3 V and 5 V signaling voltages are widely used, these expansion cards being provided with two corresponding cutouts inside the connector.

In order to make PCI expansion cards which support a 3.3 V and a 5 V signaling voltage more able to withstand over- or undervoltages on the signal lines, protection diodes integrated in a PCI controller chip are required to divert these over- or undervoltages to an I/O buffer of an expansion card IC. For this purpose it is normally provided to connect a protection diode to ground potential, to connect a protection diode to 3.3 V potential for the case of a 3.3 V signaling voltage to protect sensitive chips, for the case of a 5 V signaling voltage to optionally connect it to +5 V potential but under no circumstances to 3.3 V potential.

To implement a PCI controller on an expansion card, a so-called FPGA (Field Programmable Gate Array) chip is often used, the selection of chips with on the one hand sufficient complexity and on the other sufficient dielectric strength at the input and/or output pins (I/O pins) being severely limited due to the continuing miniaturization of the features on the chip. Currently available FPGAs often permit at the most 3.3 V as the I/O voltage, but are mainly not at all 5 V tolerant or at least unsuitable for 5 V PCI, as the requirements of the PCI specification exceed the pure 5 V tolerance, thereby greatly limiting the selection of suitable FPGAs.

I/O cells of commercially available expansion card FPGA chips meeting the requirements of the PCI specification can be operated at 3.3 V, are "5 V tolerant" and also satisfy the PCI specification in respect of a signaling voltage of 5 V. In order to meet the requirements of the PCI specification also for 3.3 V signaling voltage, this FPGA chip is provided with protection diodes connectable to 3.3 V and with protection diodes continuously connected to ground.

When the supply voltage of a computer or basic system is turned on, the expansion card's FPGA chip equipped with a volatile memory is loaded with internal interconnection information from a usually external nonvolatile memory. This information also contains information as to whether the protection diodes must be connected to or disconnected from the PCI I/O pins. Depending on the signaling voltage detected when the computer or basic system is switched on, one of two different data records each assigned to a signaling voltage is therefore used. Changing the setting of the protection diodes is only possible by completely reloading the FPGA chip and cannot therefore be performed during operation. During this reloading, the FPGA chip is inactive and all the internal information is lost.

This constitutes a problem especially if, due to cost and space constraints, the FPGA chip contains other central functional units of the expansion card in addition to the PCI controller, and the expansion card can also be supplied with an external voltage. Such a deployment with an external voltage supply is commonplace in industrial process automation applications. The other functional units can be operated via this external voltage supply even when the PCI bus is inactive, i.e. while the computer or basic system is switched off. This means that this expansion card can be used independently, without the computer, to perform control tasks.

An object of the present invention is to improve a method for operating an expansion card of a computer. In addition, an expansion card and a computer are to be created which are suitable for such operation.

This object is achieved in respect of a method, a expansion card and a computer shown in the independent claims.

It is advantageously made possible to integrate functional units of a PCI expansion card suitable for both a 3.3 V and a 5 V signaling voltage together with a PCI controller in an FPGA, said expansion card being supplied or suppliable with an external voltage independently of a signaling voltage of a computer or basic system. The board area required and the manufacturing costs are reduced. Supporting both the 3.3 V and the 5 V signaling voltage increases the number of usable basic systems.

As a result of the automatic storage of the signaling voltage to be used there is also no need for any user intervention, so that installation of an expansion card is altogether very easy to carry out.

The nonvolatile memory costs are low and the required sequential control can be integrated, for example, in a control unit required for loading the FPGA chip or implemented jointly with other functional units in a PLD chip required anyway, or in another FPGA, ASIC or microcontroller chip.

BRIEF DESCRIPTION OF THE DRAWING

The invention will now be explained in greater detail on the basis of an exemplary embodiment and with reference to the single FIGURE of the accompanying drawing, in which the FIGURE shows components of a PCI expansion card.

DETAILED DESCRIPTION OF INVENTION

Components of a PCI expansion card 1, which is connected via a suitable connector 2 to a PCI bus 3 of a computer, are an FPGA chip 4, a control unit 5, voltage detection means 6 as well as a configuration data and setting memory 7, 8. The computer usually has a plurality of connectors or a plurality of slots which are interconnected via the PCI bus 3 and are designed to accommodate further expansion cards. In the configuration data memory 7 are stored a first and a second configuration data record Ks1, Ks2, of which in the present example the configuration data record Ks1 is assigned to a 3.3 V signaling voltage and the configuration data record Ks2 to a 5 V signaling voltage. These configuration data records Ks1, Ks2 indicate to the FPGA chip 4 whether a protection circuit 14 (not shown here) of the FPGA chip 4, said circuit comprising protection diodes, is to be activated or deactivated. In the setting memory 8 is stored a data record Ds corresponding to the signaling voltage to be used and which is read out and used to select the corresponding first or second configuration data record Ks1, Ks2 if the computer is switched off and the PCI expansion card 1 is supplied by an external voltage source.

The configuration data memory 7 can be implemented e.g. in the form of a flash EPROM, EEPROM or as battery-backed RAM. For the setting memory 8 the same possibilities exist as well as e.g. the option of implementing it in the form of a battery-backed flip-flop. Self-evidently the configuration data records Ks1, Ks2 and the data record Ds can also be stored in different areas of the same nonvolatile memory.

It will be assumed that the computer is off and the expansion card is supplied with the required voltage, e.g. with a voltage of 12 V, by an external power supply unit 9. The control unit 5 reads out the data record Ds stored in the setting memory 8 e.g. as part of a factory setting and transmits the corresponding configuration data record Ks1 or Ks2 to the FPGA chip 4 via a configuration link 10. It will be assumed that the data record Ds corresponds to the second configuration data record Ks2 whereby a 5 V signaling voltage is indicated to a PCI controller 11 of the FPGA chip 4 and said controller deactivates the protection circuit 14. This means that the expansion card 1 which has functional units 12 integrated in the FPGA chip 4 and/or other functional units 13 connected to the FPGA chip 4 can be operated without knowledge of the computer's signaling voltage.

It will now be assumed that the computer is switched on during operation of the expansion card 1. This means that the signaling voltage specified by the computer for communication of the computer's functional units via the PCI bus 3 is critical for ensuring error-free data interchange. The voltage detection means 6 detect the signaling voltage at a corresponding pin of the connector 2 and transmit it to the control unit 5 which compares the detected signaling voltage with the voltage corresponding to the data record Ds. If they do not coincide e.g. because the detected signaling voltage of the computer is 3.3 V and—as assumed—the data record Ds specifies a 5 V signaling voltage, the control unit 5 reads the configuration data record Ks1 corresponding to this signaling voltage from the configuration memory 7 and transmits it to the FPGA chip 4, on the basis of which the FPGA chip 4 activates the protection circuit 14. In addition, the detected signaling voltage is stored in the data record Ds in the setting memory 8 and the previous content is therefore overwritten. If the detected signaling voltage differs from the signaling voltage preset by the data record Ds, this causes a single brief functional interruption of the expansion card 1. The content of the data record Ds in the setting memory 8 then corresponds to the signaling voltage of the computer used.

In the event that no discrepancy is detected, switching-on of the computer causes no functional interruption of the expansion card 1. This is the case e.g. if the data record Ds corresponds to a 3.3 V signaling voltage and the detected signaling voltage of the switched-on computer is likewise 3.3 V. In this case the protection circuit 14 of the FPGA chip 4 is already activated, as the configuration data record Ks1 has already been transmitted earlier to the FPGA 4.

If the data record Ds corresponds to a 3.3 V signaling voltage and the detected signaling voltage of the switched-on computer is 5 V, the control unit 5 reads out the configuration data record Ks2 corresponding to this detected signaling voltage and transmits it to the FPGA chip 4, whereupon said FPGA chip 4 deactivates the protection circuit 14. In addition, in this case also the detected signaling voltage is stored in the data record Ds in the setting memory 8, again resulting in a single brief functional interruption.

The protection circuit 14 remains deactivated if the data record Ds corresponds to a 5 V signaling voltage and this is the same as the detected signaling voltage 5 V of the switched-on computer.

The invention claimed is:

1. A method for operating an expansion card of a computer provided with at least one slot for accommodating the expansion card, comprising:

accessing a first configuration data record and a second configuration data record stored in a memory area of said expansion card, wherein the first configuration data record is assigned to a first signaling voltage, and the second configuration data record is assigned to a second signaling voltage;

transmitting the first configuration data record or the second configuration data record to a Field Programmable Gate Array (FPGA) chip of the expansion card indicating to the FPGA chip whether a protection circuit is to be activated or deactivated;

reading a third data record stored in the expansion card, when the computer is switched off and the expansion card is connected to an external voltage supply, wherein the third stored data record corresponds to the signaling voltage to be used; and transmitting a third configuration data record to the FPGA chip when the computer is switched off and the expansion card is connected to an external voltage supply, wherein the third configuration data record corresponds to the first configuration data record or the second configuration data record.

2. The method as claimed in claim 1, wherein the signaling voltage of the slot in which the expansion card is inserted is detected, when the computer is switched on.

3. The method as claimed in claim 2, wherein the third configuration data record is compared with the detected signaling voltage.

4. The method as claimed in claim 3, wherein the first configuration data record or the second configuration data record correspond is transmitted to the FPGA chip dependent on the detected signaling voltage, when the third configuration data record is different to the detected signaling voltage.

5. An expansion card for a computer, comprising:
   an external voltage supply;
   a memory area of said expansion card storing a first configuration data record and a second configuration data record, the first configuration data record assigned to a first signaling voltage, and the second configuration data record is assigned to a second signaling voltage;
   a protection circuit to protect a Field Programmable Gate Array (FPGA) chip of the expansion card; and
   a third configuration data record for transmission to the FPGA chip, when the computer is switched off, to indicate to the FPGA chip whether the protection circuit is to be activated or deactivated, wherein the third configuration data record is:
      stored in another memory area of the expansion card,
      accessed via a control unit, and
      corresponding to the first configuration data record or the second configuration data record.

6. The expansion card as claimed in claim 5, wherein the expansion card detects the signaling voltage of a slot in a computer in which the expansion card is inserted, when the computer is switched on.

7. The expansion card as claimed in claim 5, wherein the control unit compares the third configuration data record with the detected signaling voltage and, in the event of a discrepancy, transmits the configuration data record corresponding to the detected signaling voltage of the computer to the FPGA chip.

8. The expansion card as claimed in claim 7, wherein the first configuration data record and the second configuration data record are stored in a first nonvolatile memory area and the third configuration data record is stored in a second nonvolatile memory area of the expansion card.

9. A computer, comprising:
   a slot for accommodating an expansion card; and
   an expansion card having:
      an external voltage supply;
      a memory area of said expansion card storing a first configuration data record and a second configuration data record, the first configuration data record assigned to a first signaling voltage, and the second configuration data record is assigned to a second signaling voltage;
      a protection circuit to protect a Field Programmable Gate Array (FPGA) chip of the expansion card; and
      a third configuration data record for transmission to the FPGA chip, when the computer is switched off, to indicate to the FPGA chip whether the protection circuit is to be activated or deactivated, wherein the third configuration data record is:
      stored in another memory area of the expansion card,
      accessed via a control unit, and
      corresponding to the first configuration data record or the second configuration data record.

* * * * *